UNITED STATES PATENT OFFICE.

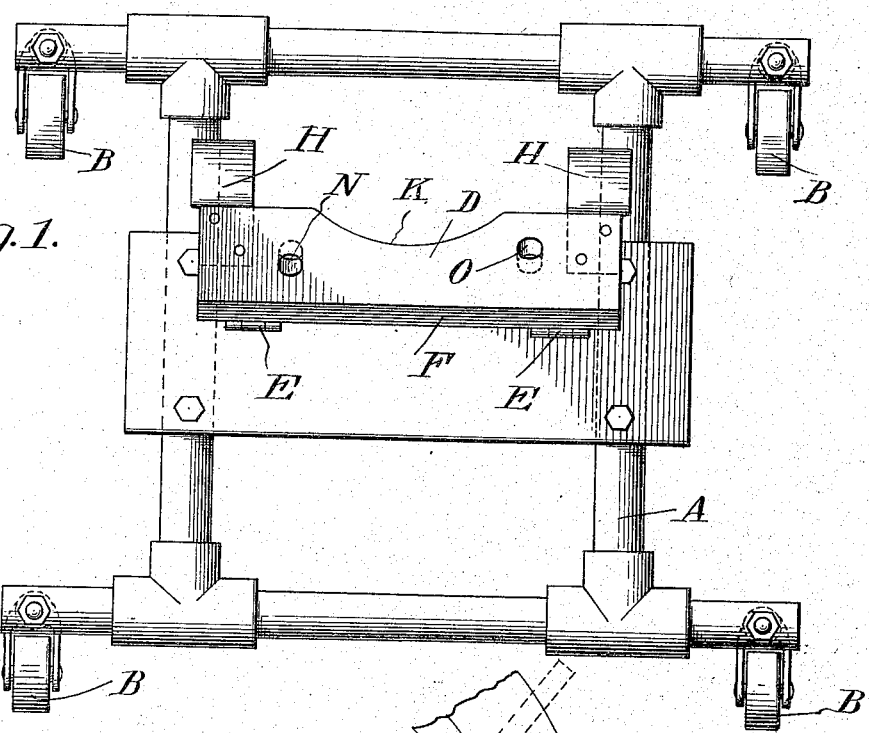
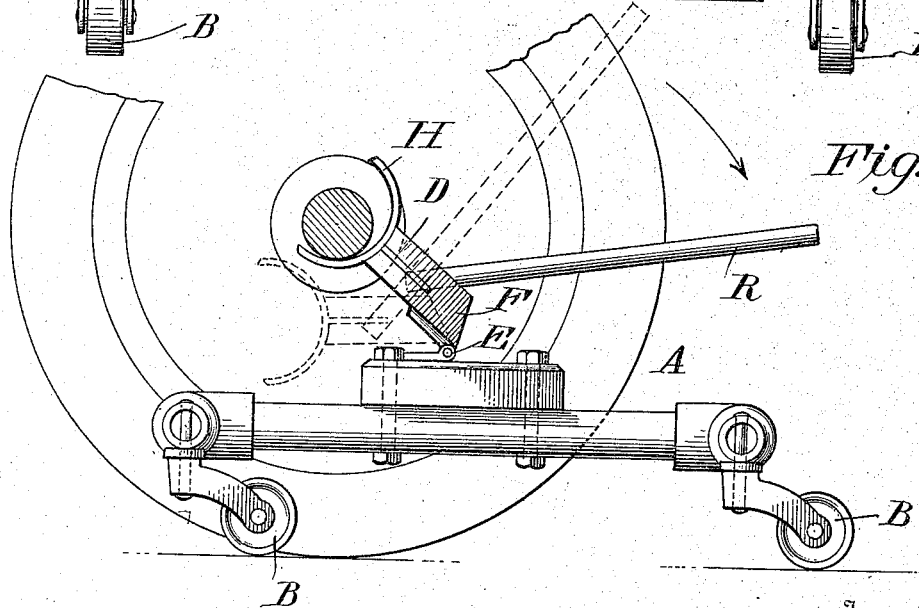

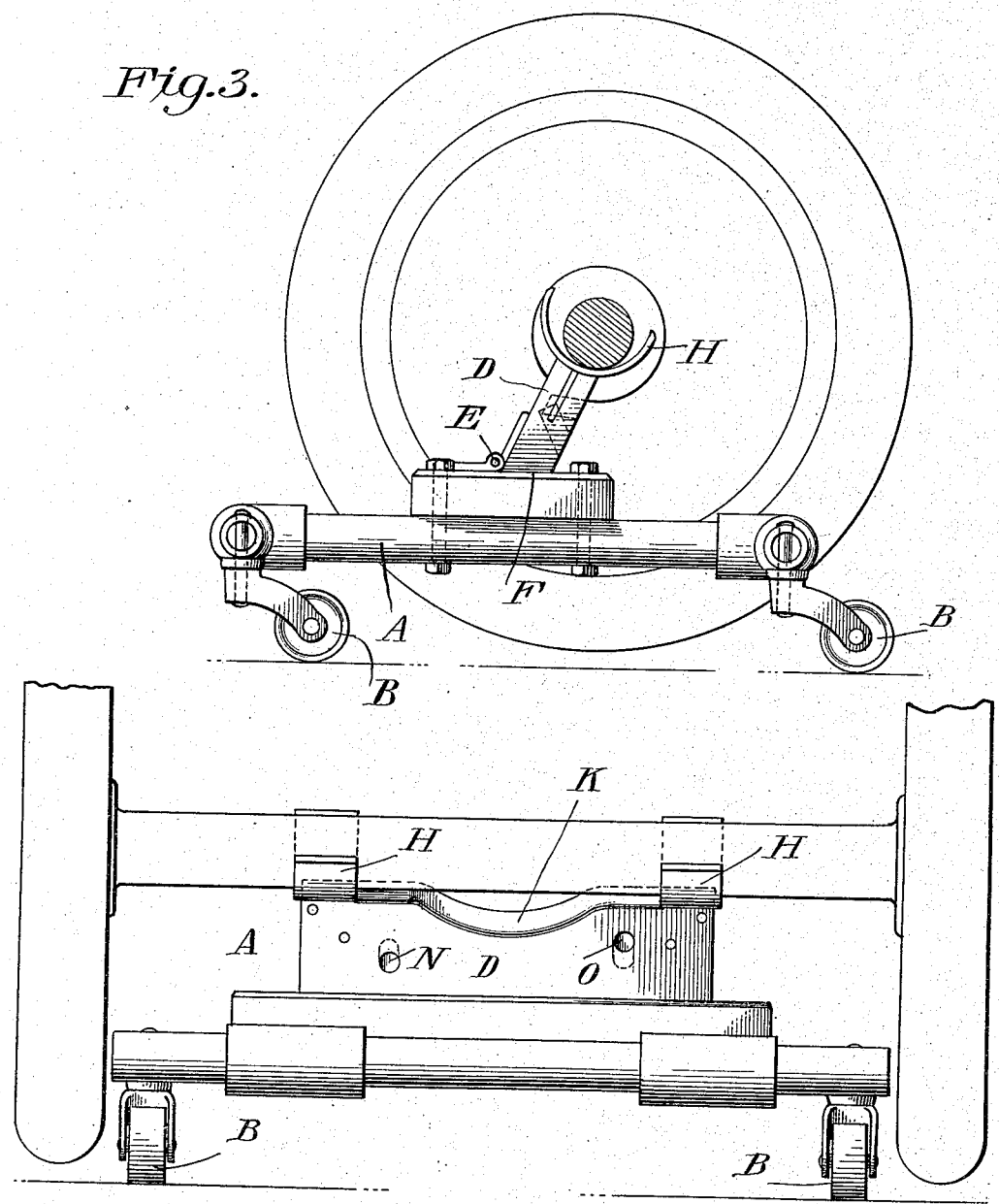

JOHN A. JEFFERY, OF CANTON, NEW YORK, ASSIGNOR OF ONE-HALF TO ROLLIN E. CLEAVELAND, OF CANTON, NEW YORK.

TRUCK FOR RAISING AUTOMOBILES.

1,171,049.  Specification of Letters Patent.  Patented Feb. 8, 1916.

Application filed April 9, 1915. Serial No. 20,236.

*To all whom it may concern:*

Be it known that I, JOHN A. JEFFERY, a citizen of the United States, residing at Canton, in the county of St. Lawrence and State of New York, have invented certain new and useful Improvements in Trucks for Raising Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trucks for raising an automobile or other vehicle for the purpose of moving the same from the surface upon which the truck stands.

My invention comprises various details of construction, combinations and arrangements of parts which will be hereinafter fully described, shown in the accompanying drawings and then specifically defined in the appended claims.

I illustrate my invention in the accompanying drawings, in which:

Figure 1 is a plan view of the apparatus. Fig. 2 is an end view showing the same as applied to the axle of a vehicle. Fig. 3 is an end view showing the apparatus in its supporting position. Fig. 4 is a side elevation.

Reference now being had to the details of the drawings by letter, A designates the frame of a truck which may be of any construction found well adapted for the purpose. Said truck is provided with a series of caster wheels B thereon which support the same. Hinged to the floor of the truck is a beam D fastened to the floor by means of hinges E, and the lower edge of said beam is beveled as at F to allow the latter to swing to one side from a vertical position and rest upon the floor when in position to hold a vehicle elevated. Concaved axle holders, designated by letter H, have shank portions engaging slots in the free swinging edge of said beam to which they are held and are spaced apart as shown, the upper edge of the beam intermediate the holders being recessed as at K in order that it will not interfere with parts of the vehicle to be raised. Said beam is provided with diagonally disposed holes N and O, adapted for the reception of the pry bar which is inserted therein when it is desired to cause the beam to be tilted in one direction or the other.

In operation, the truck is rolled up to the car so that the axle will be positioned in the elevating holders, as shown in the drawings and the bar inserted in the aperture N, after which, by pulling down upon the pry bar, the vehicle may be raised as the truck is moved underneath the same and, when the beam is swung to the position shown in the end view of the drawings, it will be noted that the beveled edge thereof will rest upon the floor of the car and throw the weight upon the latter, thus holding the vehicle so that the wheels will be free from the surface upon which the truck rests.

When it is desired to lower the truck, a reverse movement imparted to the swinging beam through the medium of the pry bar will allow the truck to move in the opposite direction and the vehicle lowered so that its weight will rest upon its own wheels.

What I claim to be new is:—

1. An apparatus for raising and holding vehicles suspended, consisting of a truck with wheels upon which the same is mounted, a beam hinged upon the truck, and having its lower hinged end beveled and adapted to contact with the floor of the car when in an operative position, and means upon the beam for receiving and supporting the axle of a vehicle.

2. An apparatus for raising and holding vehicles suspended, consisting of a truck with wheels upon which the same is mounted, a beam hinged upon the truck and having its lower hinged end beveled and adapted to contact with the floor of the car when in an operative position, and concaved axle holders fastened to the free swinging edge of said beam.

3. An apparatus for raising and holding vehicles suspended, consisting of a truck with wheels upon which the same is mounted, a beam hinged upon the truck and having its lower hinged end beveled and adapted to contact with the floor of the car when in an operative position, concaved axle holders fastened to the free swinging edge of said beam, said beam having diagonally disposed openings with holes through the same for the reception of a pry bar.

In testimony whereof I hereunto affix my signature in presence of two witnesses.

JOHN A. JEFFERY.

Witnesses:
FRANK N. CLEAVELAND,
GENEVIEVE BANTA.

Copies of this patent may be obtained for five cents each, by addressing the "Commissioner of Patents, Washington, D. C."